Nov. 25, 1969     D. O. NASH     3,480,236
THRUST VECTORING EXHAUST SYSTEM
Filed Sept. 5, 1967     2 Sheets-Sheet 1
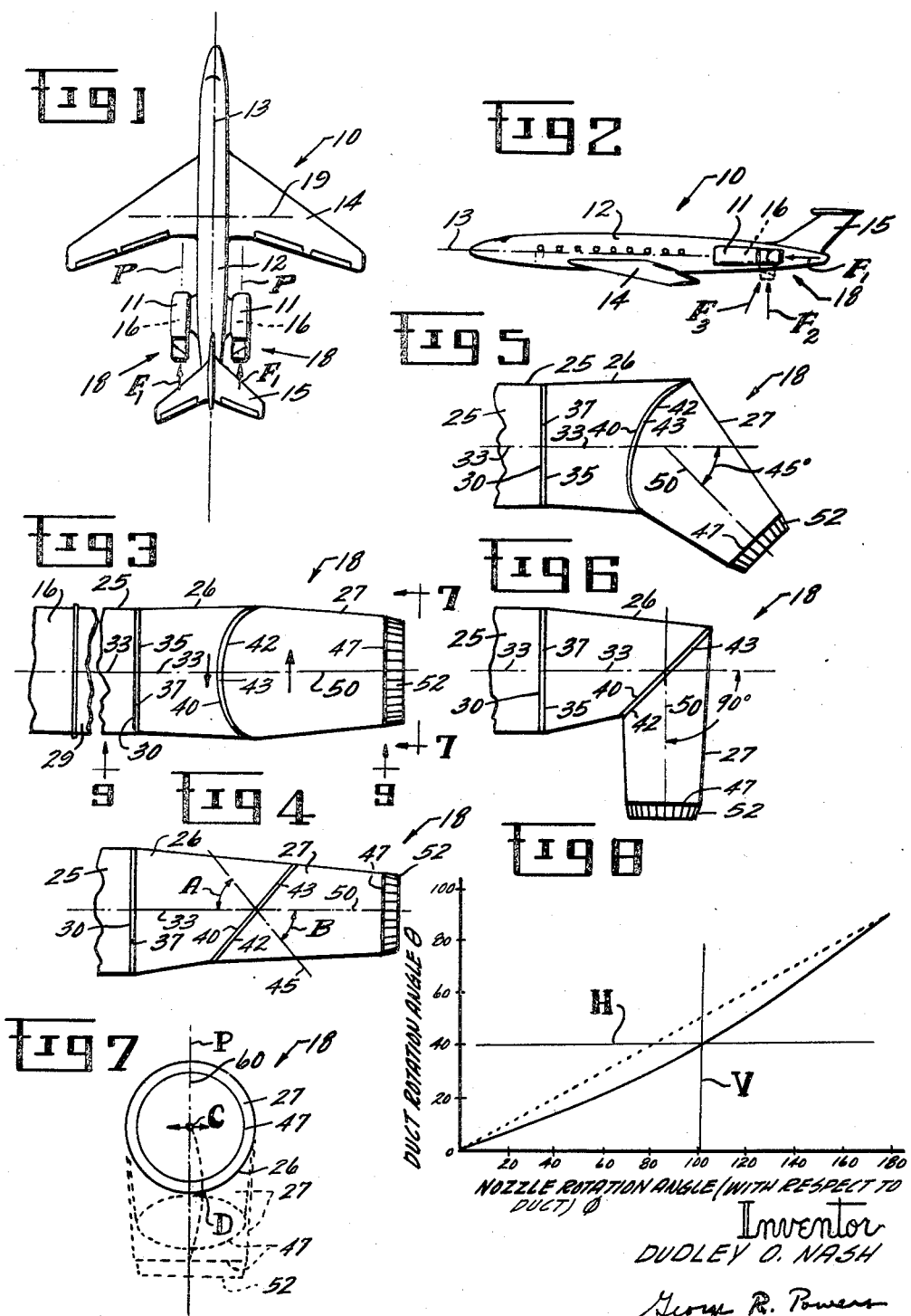
Inventor
DUDLEY O. NASH
George R. Powers
ATTORNEY—

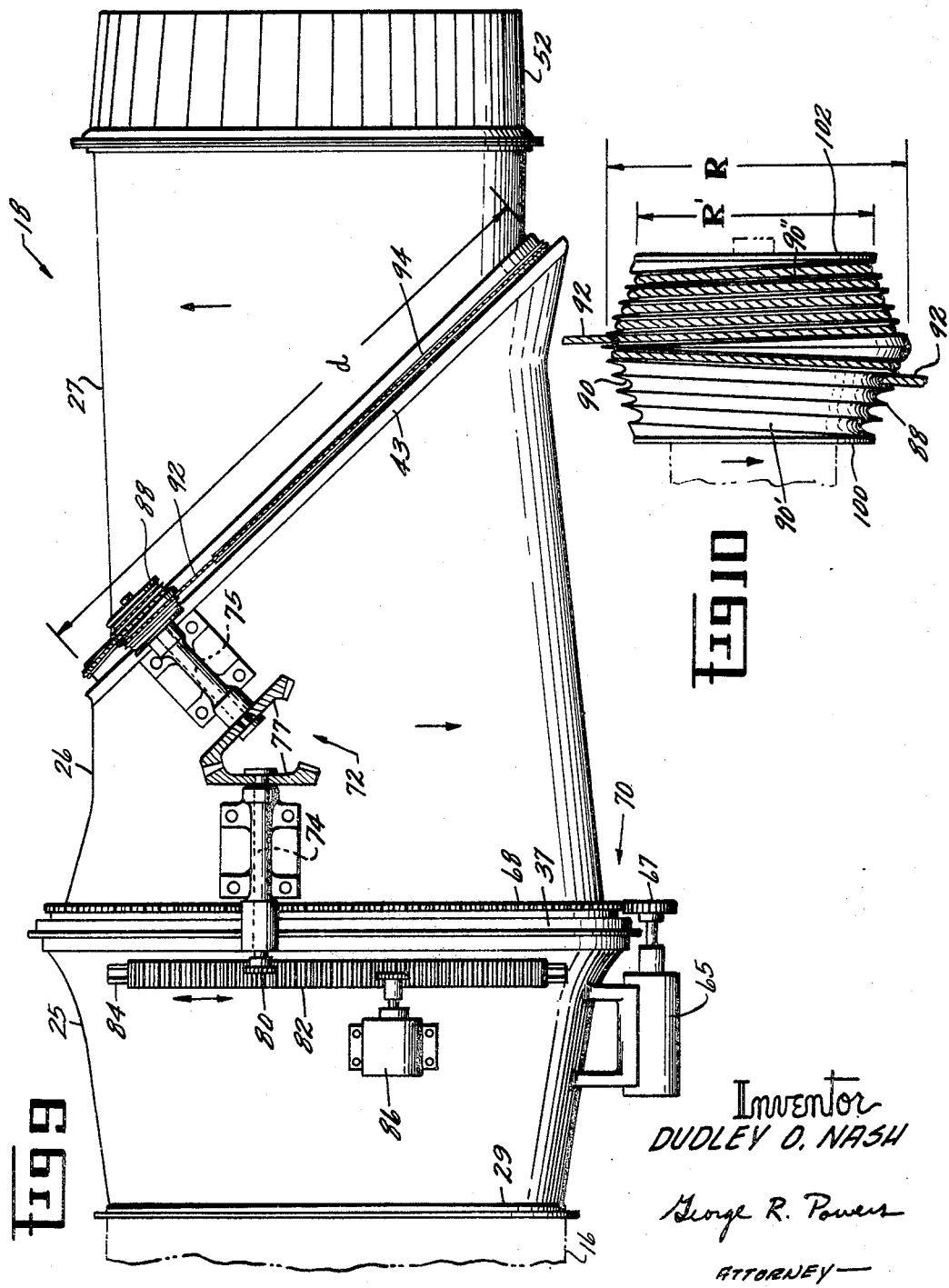

United States Patent Office 3,480,236
Patented Nov. 25, 1969

3,480,236
THRUST VECTORING EXHAUST SYSTEM
Dudley O. Nash, Cincinnati, Ohio, assignor to General Electric Company, a corporation of New York
Filed Sept. 5, 1967, Ser. No. 665,432
Int. Cl. B64b *1/24;* F02k *1/24;* B64c *15/04*
U.S. Cl. 244—53                                   11 Claims

ABSTRACT OF THE DISCLOSURE

An exhaust system including at least two relatively rotatable ducts and actuation means for simultaneously rotating the ducts in opposite directions in a predetermined manner in order to selectively direct the thrust produced by a jet propulsion engine.

This invention relates to a thrust vectoring exhaust system for jet propulsion engines and, more particularly, to actuation means for selectively adjusting the exhaust apparatus such that the thrust acts at all times in a single plane.

To provide vertical and short take-off and landing capability, aircraft are sometimes equipped with rotatable thrust vectoring or directing devices for discharging the motive fluid produced by a jet propulsion engine in various directions relative to the aircraft. By properly positioning the elements comprising the thrust vectoring devices, the motive fluid may be directed rearwardly relative to the aircraft for producing forward thrust during cruise operation, downwardly for producing substantial lift during take-off, landing, and transitional maneuvers, and forwardly for producing reverse thrust to slow or stop the aircraft. Typical devices of this type direct the motive fluid such that substantial side forces are exerted on the aircraft when the devices are in certain thrust vectoring positions. Since these devices are typically used in symmetrical arrangements with respect to the longitudinal axis of the aircraft, the side forces ordinarily balance. However, if such an aircraft is forced to operate with one or more engines and the associated thrust vectoring devices in operative, the side forces, which are no longer balanced, will exert a yawing moment on the aircraft. As a result, the aircraft will tend to rotate about its vertical axis. If yawing occurs during a critical aircraft maneuver such as take-off or landing, the aircraft can be extremely difficult or even impossible to control.

It is therefore an object of this invention to provide for jet propelled aircraft an improved thrust vectoring system which does not impose yaw producing moments on the aircraft.

Another object is to provide for jet propelled aircraft an improved thrust vectoring system capable of directing the motive fluid through a range of positions without exerting side forces on the aircraft throughout the range.

Briefly stated, in carrying out the invention in one form, an exhaust system for selectively directing a stream of motive fluid produced by a jet propulsion engine includes a fixed duct having an outlet of circular configuration and at least two movable ducts each having an inlet and an outlet of circular configuration disposed in non-parallel planes. The ducts are assembled with the outlet of the fixed duct registering with the inlet of a first movable duct and the outlet of the first movable duct registering with the inlet of a second movable duct, suitable bearings being provided between the ducts for permitting relative rotation therebetween. The ducts are interconnected by actuation means which simultaneously rotates the first movable duct and the second movable duct in opposite angular directions in a non-linear manner, being such that the thrust produced by a stream of motive fluid acts at all times in a single plane. By disposing two or more exhaust systems of this invention on opposite sides of the longitudinal axis of an aircraft and arranging each exhaust system such that thrust produced thereby acts at all times in a plane normal to the lateral axis of the aircraft, yaw producing side forces are substantially eliminated even in the event that one exhaust system is inoperative.

By another aspect of the invention, the actuation means includes primary drive means for rotating and positioning the first movable duct relative to the fixed duct and secondary drive means for differentially rotating and positioning the second movable duct relative to the first duct. The secondary drive means preferably includes cam means positioned as a direct function of the position of the first movable duct and interconnecting means between the cam means and the second movable duct for positioning the second movable duct in accordance with the position of the cam means, the non-linear relationship between the positions of the first and second movable ducts being determined by the configuration of the cam means. In the illustrated embodiment of the invention, the cam means is a drum of varying radius and the interconnecting means is a cable, the drum and the second movable duct having grooves therein for receiving and guiding the cable. By a still further aspect of the invention, supplementary drive means may be provided in conjunction with the secondary drive means for moving the thrust forces out of the single plane if for control purposes it is desired to exert limited side forces on the aircraft.

While the novel features of the invention are set forth with particularity in the appended claims, the invention, both as to organization and content, will be better understood and appreciated, along with other objects and features thereof, from the following detailed description when taken in conjunction with the drawing, in which:

FIG. 1 is a plan view of an aircraft equipped with the thrust vectoring apparatus of this invention;

FIG. 2 is a side elevation view of the aircraft of FIG. 1 illustrating the range of directions through which the thrust vectoring apparatus can direct the motive fluid;

FIG. 3 is an enlarged schematic elevation view of the exhaust system of FIGS. 1 and 2 in its forward thrust position;

FIG. 4 is a schematic plan view of the exhaust system of FIGS. 1 and 2 in its forward thrust position;

FIG. 5 is a view similar to FIG. 3 showing the exhaust system in a 45° vectoring position;

FIG. 6 is a view similar to FIG. 3 showing the exhaust system in its vertical thrust position;

FIG. 7 is a view taken along viewing line 7—7 of FIG. 3, the corresponding positions of FIGS. 5 and 6 being illustrated by broken lines;

FIG. 8 is a graphical illustration of the non-linear relationship between rotation of the various ducts comprising the exhaust system;

FIG. 9 is an enlarged view taken along viewing line 9—9 of FIG. 3; and

FIG. 10 is an enlarged view of the drum of FIG. 9.

Referring first to FIGS. 1 and 2, an aircraft indicated generally by the numeral 10 is illustrated, the aircraft 10 having a pair of nacelles 11 symmetrically mounted on opposite sides of the fuselage 12 and the longitudinal axis 13 of the aircraft 10 intermediate the wings 14 and the tail assembly 15. Each of the nacelles 11 houses a gas turbine engine 16 which supplies a stream of hot motive fluid to an exhaust system indicated generally by the numeral 18. In accordance with the present invention, the exhaust systems 18 can be positioned to selectively direct the stream of motive fluid through a range of positions. More particularly, attention is directed to the illustrated force vectors of FIGS. 1 and 2. When the streams of motive fluid are unvectored, forward thrust forces $F_1$ are exerted on the airframe 10; when the streams are turned through 90°, lift forces $F_2$ are exerted on the airframe 10; and when the streams are turned through more than 90°, forces $F_3$ having significant reverse thrust components are exerted on the airframe 10. It should be particularly noted that the forces $F_1$, $F_2$, and $F_3$ produced by each engine 16 and the associated exhaust system 18 act in a single vertical plane P parallel to the aircraft longitudinal axis 13 and normal to the lateral axis 19 of the aircraft 10, the plane P being illustrated by FIG. 1. As a result, the thrust forces $F_1$, $F_2$, and $F_3$ exert no side components, balanced or unbalanced, on the airframe at any time.

Turning now to FIGS. 3–7, the general mechanical arrangement of the exhaust systems 18 will be described. As illustrated, each exhaust system 18 includes a fixed duct 25, a first movable duct 26, and a second movable duct 27, the ducts 25, 26 and 27 being of generally cylindrical configuration. The fixed duct 25 includes an upstream portion 29 which communicates with the gas turbine engine 16 for receiving hot motive fluid therefrom and an outlet 30 of circular configuration, the axis of the outlet 30 preferably being coaxial with the axis 33 of the duct 25 as illustrated. The first movable duct 26 includes an inlet 35 of circular configuration registering with the outlet 30 and secured thereto by a large size ring bearing 37 which permits rotation of the first movable duct 26 relative to the fixed duct 25 about the axis 33, which is of course also the axis of the inlet 35. An outlet 40 of circular configuration is located at the downstream end of the duct 26, this outlet 40 being connected to a circular inlet 42 of the second movable duct 27 by a ring bearing 43 which permits relative rotation between the first and second movable ducts 26 and 27 about an axis 45 (see FIG. 4) common to both the outlet 40 and the inlet 42. At its downstream end, the second movable duct 27 has an outlet 47 having an axis coaxial with axis 50 of the duct 27, and movable flaps 52 are connected to the outlet 47 for varying the exhaust area. The variable area of the outlet 47 may be controlled by suitable control means in a manner well known in the art.

As indicated above, the outlet 30 is normal to the axis 33 of the fixed duct 25 and the outlet 47 is normal to the axis 50 of the second movable duct 27. Similarly, it will be obvious that the inlet 35 of the first movable duct 26 is normal to the axis 33 of the fixed duct 25. It is essential to the present invention, however, that the outlet 40 of the first movable duct 26 not be normal to the axis 33 and that the inlet 42 of the second movable duct 27 not be normal to the axis 50. In other words, the inlets and outlets of the movable ducts are disposed in non-parallel planes so that relative rotation of the ducts can result in the various thrust vectoring positions illustrated by FIGS. 3–7. More particularly, in the illustrated embodiment in which thrust vectoring through a 100° range is possible, the axis 45 of the outlet 40 and the inlet 42 forms angles A and B of 50° and 50°, respectively, with the axes 33 and 50. It will, of course, become obvious to those skilled in the art that the angles A and B can be varied to accommodate various ranges of thrust vectoring. Furthermore, it will be obvious that the axis of the outlet 30 and the inlet 35 could, if desired, be angularly offset from the axis 33.

It has been stated above that the ducts 25, 26 and 27 are of generally cylindrical configuration and that the outlets and inlets to the ducts are of circular configuration. Since, however, the outlet 40 of the first movable duct 26 and the inlet 42 of the second movable duct 27 are not normal to the axes 33 and 50, the ducts 26 and 27, cannot, in the vicinity of the openings 40 and 42, be of a true cylindrical configuration. They should, however, be as close as possible to a true cylindrical configuration, this approximation being referred to herein as a "generally cylindrical configuration."

Referring now to FIGS. 3–6, it will be noted that simultaneous rotation of the movable ducts 26 and 27 in opposite angular directions, as illustrated by the arrows of FIG. 3, will result in progressive movement of the exhaust system 18 from the forward thrust position of FIG. 3 to the transitional thrust position of FIG. 5 to the vertical thrust position of FIG. 6. Although not illustrated, continued rotation after the vertical position is reached will move the exhaust system 18 to a reverse thrust position. Rotation of the first and second movable ducts 26 and 27 at constant rates in opposite directions can produce thrust positions as illustrated by FIGS. 3 and 6, and persons skilled in the art have have heretofore thought that this was the ideal way to produce the desired vectoring. However, it has been found that such constant rate rotation can result in substantial side forces on the aircraft and accompanying yawing moments. To illustrate, FIG. 7 includes a line 60 which illustrates the path that the center C of the outlet 47 would follow if the ducts 26 and 27 were rotated at constant angular rates. If the ducts were rotated in equal amounts and stopped with the center C in position D, which correseponds roughly with the intermediate thrust position of FIG. 5, the side thrust produced on the aircraft would be approximately 13% of total thrust, an extremely significant amount in the event that one of the engines 16 should become inoperative for some reason.

By the present invention, the center C of the outlet 47 can be made to move in the single vertical plane P as illustrated by FIGS. 1 and 7. With the center C constrained to the single plane, there are no side forces at any time to produce yawing moments on the aircraft. (If one engine 16 were to become inoperative, the relatively small distance between the longitudinal axis 13 of the aircraft and the plane P of the operative engine 16 would, of course, cause a slight yawing moment. Such a moment is insignificant and can easily be controlled by means of a supplementary drive system described at a later point in this description.) In accordance with the present invention, the movable ducts 26 and 27 are rotated in opposite directions in a predetermined non-linear manner (varying rate) to provide the desired motion in the single plane P. With respect to FIG. 8, the required non-linear relationship between rotation of the duct 26 and rotation of duct 27 relative to duct 26 for the exhaust system 18 is illustrated graphically by the solid line, the ordinate being angular relationship between the first movable duct 26 and the fixed duct 25 and the abscissa being the corresponding angular relationship between the second movable duct 27 and the first movable duct 26. By way of comparison, the broken line of FIG. 8 illustrates the linear relationship which would exist if the ducts 26 and 27 were rotated at all times at a constant rate.

Turning attention now to FIG. 9, the actuation system for rotating the ducts 26 and 27 in the prescribed non-linear manner will be described. To rotate the first movable duct 26 relative to the fixed duct 25, a suitable drive motor 65 mounted on the fixed duct 25 drives a pinion gear 67 which meshes with a ring gear 68 peripherally mounted on the first movable duct 26. This combination of the drive motor 65, the pinion gear 67, and the ring gear 68 comprises a primary drive system 70 whereby the pilot can directly position the first movable duct 26. Through the secondary drive system 72 which will be described presently, the primary drive system 70 provides the power for positioning the second movable duct 27. The secondary drive means includes an input shaft 74 and an output shaft 75 rotatably mounted on the first movable duct 26, the shafts 74 and 75 being interconnected by bevel gears 77 such that the two shafts rotate in unison. The input shaft 74 has a gear 80 secured thereto which meshes with a sector gear 82 carried by a slide 84, the gear 82 normally being held in a fixed position by a supplementary drive motor 86. Sector gear 82 is an arcuate segment having an arc sufficient to engage with gear 80 throughout the range of rotation of duct 26, to which shaft 74 is journaled, and to further remain engaged with gear 80 when gear 82 is moved on slide 84 by supplementary drive motor 86 (the functioning of which is hereinafter explained). In this connection, FIGURE 8 illustrates a range of rotation of duct 26 of approximately 100°, which is consistent with the illustrations of FIGURE 3 (elevation), 4 (plan), and 6 wherein rotation of duct 26 through an angle of approximately 90° is indicated to move the system from the position of FIGURE 3 to that of FIGURE 6. The output shaft 75 has a drum 88 secured thereto for rotation with the shaft 75, the drum 88 being of varying radius and having grooves 90 therein for receiving and guiding a cable 92. The cable 92 is also received in a sheave or groove 94 mounted peripherally on the second movable duct 27. The configuration of the drum 88 and the grooves 90 and 94 are such that the desired non-linear relationship between the angular positions of the first and second movable ducts is obtained during thrust vectoring operation. The specific configuration of the drum 88 will be described at a later point in the specification.

To provide thrust vectoring, the pilot indicates through suitable control apparatus that a predetermined amount of thrust vectoring is required, the control apparatus causing the drive motor 65 to rotate the first movable duct 26 in the direction indicated by the arrows to a precise angular position, such as that indicated by the horizontal line H of FIG. 8. Rotation of the first movable duct 26 causes the shafts 74 and 75 and the drum 88 to rotate in the directions indicated since the gear 82 is held in a fixed position, the drum 88 thus being angularly positioned as a linear function of the position of the first movable duct 26 because of the positive drive between the gear 80 and the sector gear 82. However, this linear positioning of the drum 88 is transmitted through the cable 92 to the second movable duct 27 in a non-linear manner because of the varying radii of the drum 88 and the groove 90, the result being that the second movable duct 27 is positioned as indicated by the vertical line V of FIG. 8.

For any given exhaust system, the drum 88 and the track 94 should be sized to provide the desired non-linear relationship, and these sizes will of course vary for different exhaust systems. By way of example, however, the exhaust system 18 of FIGS. 1–7 and 9 includes a drum 88 having a maximum radius R of 5 inches at its center and minimum radii R' of 3.5 inches at its ends as illustrated by FIG. 10. The end 100 adjacent the output shaft 75 has a left-hand groove 90' and the end 102 has a right-hand groove 90'', one end of the cable 92 being secured to the large radius end of the groove 90' and the other being secured to the small radius end of the groove 90''. With the groove 90' substantially empty as illustrated, the groove 90'' is filled, and the intermediate portion of the cable 92 is disposed in the track 94 about the entire periphery of the second movable duct 27 and is secured thereto to prevent relative motion therebetween. Rotation of the drum 88 in the direction indicated by FIGS. 9 and 10 will result in unwinding of the cable 92 from the groove 90'' and winding of the cable 92 on the groove 90', the engagement between the cable 92 and the sheave 94 causing corresponding movement of the second movable duct 27. This corresponding movement of duct 27 will proceed from a higher rate relative to the rate of rotation of duct 26 to a lower rate relative to the rate of rotation of duct 26 because the ratio between the effective radius of drum 88 (the driving member) to that of sheave 94 (the driven member) proceeds from a higher to a lower value as cable 92 is wound from the position shown. This condition of the relative motion between ducts 26 and 27 corresponds to that illustrated graphically in FIGURE 8 wherein the rate of change of the angle between duct 27 and duct 26 (nozzle rotation angle $\phi$) with respect to duct 26 rotation angle $\theta$ (i.e., the inverse of the slope of the solid line) proceeds from a higher to a lower value. To complete the description of the illustrated embodiment, it should be noted that the diameter "D" of the sheave 94 is 40 inches and that the ratio of angular movement of the drum 88 to angular movement of the first movable duct 26 is 20 to 1.

As described above, the exhaust system 18 of this invention provides thrust vectoring in a single plane P such that substantially no yaw producing side forces are produced on the aircraft 10. By a further aspect of the invention, the center C of the outlet 47 can be moved out of the single plane P as illustrated by the arrows of FIG. 7 if it is desired to exert side forces for control purposes during hover or similar operating conditions. To provide this capability, the supplementary drive motor 86 is geared to the sector gear 82 for moving the gear 82 out of its normally fixed position, the gear 82 being mounted on the slide 84 for peripheral movement about the duct 25. When the gear 82 is moved from its fixed position as illustrated by the arrows of FIG. 9, the center C of the outlet 47 will be correspondingly moved out of the single plane P in the manner illustrated by the arrows of FIG. 7. More particularly, when it is desired to obtain a side force with the exhaust system positioning as illustrated by FIGS. 3, 7 (solid lines) and 9, the driver motor 65 holds the first movable duct 26 in a fixed position and the drive motor 86 moves the gear 82 in the desired direction. Movement of the gear 82 causes corresponding rotation of the shaft means comprising the shafts 74 and 75 because of the positive engagement between the gear 82 and the gear 80. Rotation of the shaft means and the drum 88 causes the duct 27 to move to a vectored position out of the single plane P.

In the foregoing description, only one exhaust system 18 has been described. It will occur to those skilled in the art, however, that in a dual engine arrangement the controls of the separate exhaust systems 18 will ordinarily be interconnected for operation in unison so that symmetrical thrust forces are exerted on the aircraft. It will also be appreciated that the invention is applicable to single engine propulsion systems having a single fuselage mounted exhaust vectoring system. Furthermore, it will be obvious that the present invention can be equally applied to exhaust vectoring systems having more than two movable ducts, provided that suitable adjustments are made in the various dimensions and orientations of the planes within which inlets and outlets are located.

From the foregoing, it will be appreciated that the thrust vectoring system of the persent invention permits thrust vectoring through a range of positions without exerting substantial side forces on the aircraft. As a result, an aircraft equipped with the thrust vectoring system of this invention is not subject during operation to hard-to-control yaw producing moments.

It will be understood that the invention is not limited to the specific details of construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. For selectively directing a stream of motive fluid produced by a jet propulsion engine, an exhaust system comprising:
    a fixed duct having an outlet of circular configuration,
    a first movable duct having an inlet of circular configuration registering with the outlet of said fixed duct for receiving motive fluid therefrom and an outlet of circular configuration,
    the inlet and the outlet of said first movable duct being disposed in non-parallel planes, a second movable duct having an inlet of circular configuration registering with the outlet of said first movable duct for receiving motive fluid therefrom and an outlet, the inlet and the outlet of said second movable duct being disposed in non-parallel planes, first bearing means between said fixed duct and said first movable duct for permitting relative rotation therebetween about the common axis of the outlet of said fixed duct and the inlet of said first movable duct, second bearing means between said first movable duct and said second movable duct for permitting relative rotation therebetween about the common axis of the outlet of said first movable duct and the inlet of said second movable duct, and actuation means interconnecting said ducts for simultaneously rotating said first movable duct relative to said fixed duct and said second movable duct relative to said first movable duct, said actuation means including means adapted to cause the rotation of said second movable duct relative to said first movable duct to vary non-linearly with rotation of said first movable duct relative to said fixed duct, the non-linear characteristic of said actuation means being such that the thrust produced by a stream of motive fluid discharged from said exhaust system acts at all times in a single plane.

2. An exhaust system as defined by claim 1 in which the non-parallel planes within which said inlets and outlets are disposed are selected such that the thrust produced by a stream of motive fluid discharged from the exhaust system can be varied throughout a range of at least 90 degrees.

3. An exhaust system as defined by claim 1 in which the outlet of said second movable duct includes movable means for varying the exhaust area thereof, the axis of said outlet being coaxial with the axis of said second movable duct.

4. An exhaust system as defined by claim 1 in which said actuation means comprises:

primary drive means for rotating and positioning said movable duct relative to said fixed duct, and secondary drive means for differentially rotating and positioning said second movable duct relative to said first movable duct, said secondary drive means including cam means positioned as a direct function of the angular position of said first movable duct and means interconnecting said cam means and said second movable duct for positioning said second movable duct in accordance with the position of said cam means, whereby the non-linear relationship between the positions of said first and second movable ducts is determined by the configuration of said cam means.

5. An exhaust system as defined by claim 4 in which said cam means comprises a drum of varying radius and said interconnecting means comprises a cable, said drum and said second movable duct having grooves therein for receiving and guiding said cable.

6. An exhaust system as defined by claim 5 in which said secondary drive means further include shaft means mounted on said first movable duct for rotation in a fixed position relative to said first movable duct and input means providing a positive mechanical interconnection between said fixed duct and said shaft means for angularly positioning said shaft means as a direct function of the position of said first movable duct relative to said fixed duct, said drum being secured to and positioned by said shaft means.

7. An exhaust system as defined by claim 6 in which said input means comprises a first force transmitting member mounted on said fixed duct in a relatively fixed position and a second force transmitting member secured to said shaft means, said first and second force transmitting members being positively engaged such that movement of said first movable duct by said primary drive means results in directly proportional angular movement of said shaft means and said associated cam means.

8. An exhaust system as defined by claim 7 in which said primary drive means comprises motor means mounted on said fixed duct, a pinion gear secured to and driven by said motor means, and a ring gear peripherally secured to said first movable duct engaged by said spur gear such that said first movable duct is directly positioned by said motor means.

9. An exhaust system as defined by claim 8 in which said first and second force transmitting members comprise meshed gears.

10. An exhaust system as defined by claim 8 further including supplementary drive means connected to said first force transmitting member for selectively moving said first force transmitting member out of said relatively fixed position so as to correspondingly move the thrust produced by a stream of motive fluid out of said single plane, thereby providing yaw control.

11. An exhaust system as defined by claim 10 in which the outlet of said second movable duct includes movable means for varying the exhaust area thereof, the axis of said outlet being coaxial with the axis of said second movable duct.

References Cited

UNITED STATES PATENTS

| | | | |
|---|---|---|---|
| 2,886,262 | 5/1959 | Fletcher | 244—23 |
| 2,927,424 | 3/1960 | Hyde | 239—265.39 |
| 2,933,891 | 4/1960 | Britt | 244—23 X |
| 3,067,579 | 12/1962 | Olbrich | 244—23 X |
| 3,193,217 | 7/1965 | Marchant et al. | 244—23 |

FOREIGN PATENTS 1,497,900  9/1967  France.

MILTON BUCHLER, Primary Examiner

J. E. PITTENGER, Assistant Examiner

U.S. Cl. X.R.

60—232; 239—265.35